Patented Jan. 6, 1953

2,624,746

UNITED STATES PATENT OFFICE 2,624,746

NUCLEAR MONOHALOGENATED 1-HYDROXY - 4 - β - FLUOROALKYLAMINO-ANTHRAQUINONE COMPOUNDS AND PROCESS FOR THEIR PREPARATION

Joseph B. Dickey, Rochester, N. Y., assignor to Eastman Kodak Company, Rochester, N. Y., a corporation of New Jersey No Drawing. Application January 27, 1950, Serial No. 140,952

4 Claims. (Cl. 260—380)

This invention relates to new nuclear monohalogenated 1-hydroxy-4-β-fluoroalkylamino-anthraquinone compounds and their application to the art of dyeing or coloring.

I have discovered that the new anthraquinone compounds having the general formula:

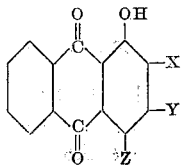

wherein X and Y each represents a hydrogen atom, a bromine atom or a chlorine atom and wherein at least one but only one of the members X and Y is a hydrogen atom and Z represents the 2,2-difluoroethyl group, the 2,2-difluoroethyl group, the 2,2-difluoro-n-propyl group, the 2,2-difluoroisopropyl group, the 2,2-difluoro-n-butyl group, the 2,2,2-trifluoroethyl group or the 2,2,2-trifluoroisopropyl group are valuable dyes for coloring textile materials made of or containing a cellulose alkyl carboxylic acid ester having two to four carbon atoms in the acid groups thereof. These dye compounds when applied to the aforesaid materials give red to pinkish-orange dyeings which have outstanding light and gas fastness properties. They are particularly of use for the coloration of cellulose acetate textile materials.

The dyeings obtained on cellulose acetate textile materials with the new dye compounds are appreciably faster to gas than the corresponding compounds not containing a chlorine or bromine atom in the 2- or 3- position of the anthraquinone nucleus. Additionally the dyeings differ in color and are equally fast or slightly faster to light than the dyeings obtained with the anthraquinone compounds not containing a chlorine or bromine atom in the 2- or 3- position.

It is an object of my invention to provide new anthraquinone dye compounds. Another object is to provide a satisfactory process for the preparation of the new anthraquinone dye compounds. A further object is to provide dyed cellulose alkyl carboxylic acid ester textile materials which possess unusually good fastness to light and gas. A particular object is to provide new anthraquinone compounds which are of especial value for the dyeing of cellulose acetate textile materials.

By cellulose alkyl carboxylic acid esters having two to four carbon atoms in the acid groups thereof, I mean to include, for example, both hydrolyzed and unhydrolyzed cellulose acetate, cellulose propionate, cellulose butyrate, cellulose acetate-propionate and cellulose acetate-butyrate.

The anthraquinone compounds of my invention containing a bromine atom or a chlorine atom in the 2-position are prepared by brominating or chlorinating the corresponding unhalogenated 1-hydroxy-4 - β - fluoroalkylaminoanthraquinone compound. The bromination or chlorination reaction is usually carried out in acetic acid in the presence of sodium acetate or potassium acetate. The bromination reaction is ordinarily effected at a temperature of about 40° C. to about 90° C. by gradually adding bromine. Conveniently the bromine can be admixed with glacial acetic acid and added in that state. The chlorination reaction is usually effected by gradually adding chlorine at a temperature of about 40° C. to about 90° C. After addition of the chlorine or bromine the temperature of the reaction mixture is ordinarily raised to about 100° C. and maintained at this temperature until reaction is complete. The reaction temperature need not be raised to 100° C. to effect completion of the reaction, but it is usually desirable to raise the reaction temperature to about 100° C. as the reaction time is shortened by so doing.

The anthraquinone compounds of my invention containing a bromine atom or a chlorine atom in the 3-position are prepared by reacting a 1-(2-fluoroalkylamino)-2,4-dibromo-anthraquinone or a 1-(2-fluoroalkylamino)-2,4 - dichloro-anthraquinone with boric acid and oleum. The reactants are ordinarily mixed together at room temperature after which the reaction mixture is gradually raised to the desired reaction temperature. When a 2,4-dibromoanthraquinone is employed as one of the reactants the temperature of the reaction mixture is slowly raised to about 120° C.–130° C. and this temperature is maintained until no more hydrogen bromide is evolved. When a 2,4-dichloroanthraquinone is employed as one of the reactants the temperature of the reaction mixture is slowly raised to about 200° C.–210° C. and maintained at this temperature until no more hydrogen chloride is evolved.

The dye compounds obtained in accordance with the procedure described herein can be purified by crystallization from a solvent therefor. Suitable solvents are, for example, xylene, acetic acid, n-butyl alcohol, toluene, o-dichlorobenzene, pyridine or ethyl alcohol.

The following examples illustrate the com-

Example 1

2 grams of 1-hydroxy-4-(2,2-difluoroethylamino)-anthraquinone and 0.7 gram of anhydrous sodium acetate are placed in 50 cc. of glacial acetic acid and heated to 90° C. 1.2 grams of bromine in 15 cc. of glacial acetic acid are added dropwise to the reaction mixture with stirring. The addition takes about one half hour. The temperature of the reaction mixture is then raised to 100° C. and this temperature is maintained for two hours. Following this the reaction mixture is cooled to room temperature and then poured into 500 cc. water to effect precipitation of the reaction product which is recovered by filtration, washed well with water and dried. The 1-hydroxy-2-bromo-4-(2,2'-difluoroethylamino)-anthraquinone thus obtained has the formula:

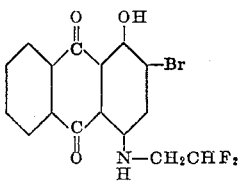

It melts at 105° C.–110° C. and colors cellulose acetate textile materials red shades. If desired the dye compound can be obtained in a purer state by crystallization from any of the solvents indicated hereinbefore, such as n-butyl alcohol, for example.

Example 2

2 grams of 1-hydroxy-4-(2,2,2-trifluoroethylamino)-anthraquinone and 0.7 gram of anhydrous sodium acetate are placed in 50 cc. of glacial acetic acid and heated to 90° C. 1.2 grams of bromine in 15 cc. of glacial acetic acid are added dropwise to the reaction mixture with stirring. The addition takes about one half hour. The temperature of the reaction mixture is then raised to 100° C. and this temperature is maintained for two hours. Following this the reaction mixture is cooled to room temperature and then poured into 500 cc. of water to effect precipitation of the reaction product which is recovered by filtration, washed well with water and dried. The 1-hydroxy-2-bromo-4-(2,2,2-trifluoroethylamino)-anthraquinone thus obtained has the formula:

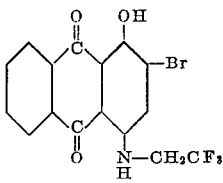

It melts at 85° C.–90° C. and colors cellulose acetate textile materials pinkish-orange shades. If desired the dye compound can be obtained in a purer state by crystallization from any of the solvents indicated hereinbefore, such as toluene, for example.

Example 3

5 grams of 1-(2,2,2-trifluoroethylamino)-2,4-dibromoanthraquinone, 2 grams of boric acid and 20 grams of 3–5% oleum are mixed together at room temperature and the temperature of the reaction mixture is then slowly raised to 120° C.–130° C. and maintained at 120° C.–130° C. for 4–6 hours or until no more hydrogen bromide is evolved. Following this the reaction mixture is cooled to 50° C.–60° C. and poured with vigorous stirring into 100 cc. of water and ice. The reaction product, 1-hydroxy-3-bromo-4-(2,2,2-trifluoroethylamino)-anthraquinone, is recovered by filtration, washed well with hot water and dried. The dye compound thus obtained is purified by crystallization from any of the solvents indicated hereinbefore, such as toluene, for example. It colors cellulose acetate textile materials red shades.

Example 4

5 grams of 1-(2,2-difluoro-n-propylamino)-2,4-dibromo-anthraquinone, 2 grams of boric acid and 20 grams of 3–5% oleum are mixed together at room temperature and the temperature of the reaction mixture is then slowly raised to 120° C.–130° C. and maintained at 120° C.–130° C. for 4–6 hours or until no more hydrogen bromide is evolved. Following this the reaction mixture is cooled to 50° C.–60° C. and poured with vigorous stirring into 100 cc. of water and ice. The reaction product, 1-hydroxy-3-bromo-4-(2,2-difluoro-n-propylamino)-anthraquinone, is recovered by filtration, washed well with hot water and dried. The dye compound thus obtained is purified by crystallization from any of the solvents indicated hereinbefore such as acetic acid, for example. It colors cellulose acetate textile materials red shades.

Example 5

2.2 grams of 1-hydroxy-4-(2,2,2-trifluoroethylamino)-anthraquinone and 0.7 gram of anhydrous sodium acetate are placed in 50 cc. of glacial acetic acid and heated to 90° C. Then .3 gram of chlorine is bubbled into the reaction mixture with stirring. The addition takes about 20 minutes. The temperature of the reaction mixture is then raised to 100° C. and this temperature is maintained for two hours. Following this the reaction mixture is cooled to room temperature and then poured into 500 cc. of water to effect precipitation of the reaction product which is recovered by filtration, washed well with water and dried. The 1-hydroxy-2-chloro-4-(2,2,2-trifluoroethylamino)-anthraquinone thus obtained colors cellulose acetate textile materials pinkish-orange shades. If desired it can be obtained in a purer state by crystallization from any of the solvents indicated hereinbefore, such as pyridine, for example.

By the use of 2.2 grams of 1-hydroxy-4-(2,2-difluoro-n-propylamino)-anthraquinone in place of 1-hydroxy-4-(2,2,2-trifluoroethylamino)-anthraquinone in the foregoing example 1-hydroxy-2-chloro-4-(2,2-difluoro-n-propylamino)-anthraquinone is obtained. It colors cellulose acetate textile materials pinkish-orange shades.

Example 6

4.5 grams of 1-(2,2-difluoroethylamino)-2,4-dibromoanthraquinone, 2 grams of boric acid and 20 grams of 3–5% oleum are mixed together at room temperature and the temperature of the reaction mixture is then slowly raised to 120° C.–130° C. and maintained there for 4–6 hours or until no more hydrogen bromide is evolved. Following this the reaction mixture is cooled to 50° C.–60° C. and poured with vigorous stirring into 100 cc. of water and ice. The reaction product, 1-hydroxy-3-bromo-4-(2,2-difluoroethylamino)-anthraquinone, is recovered by filtration, washed well with hot water and dried. The dye compound thus obtained is purified by crystallization from any of the solvents indicated hereinbefore, such as n-butyl alcohol, for example. It colors cellulose acetate textile materials bluish red shades.

By the use of 4.8 grams of 1-(2,2-difluoro-n-butylamino)-2,4-dibromoanthraquinone in place of 1-(2,2 - difluoroethylamino)-2,4 - dibromoanthraquinone in the foregoing example 1-hydroxy-3-bromo-4-(2,2-difluoro-n-butylamino)-anthraquinone having the formula:

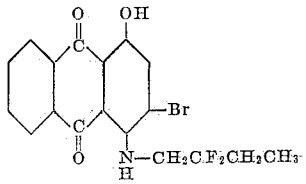

is obtained. It colors cellulose acetate textile materials red shades.

*Example 7*

4 grams of 1-(2,2,2-trifluoroethylamino)-2,4-dicloroanthraquinone, 20 grams of 3-5% oleum and 2 grams of boric acid are mixed together at room temperature and the temperature of the reaction mixture is then slowly raised to 200° C.–210° C. over a period of 5 hours and maintained at 200° C.–210° C. until no more hydrogen chloride is evolved. Then the reaction mixture is cooled to 50° C.–60° C. and poured with vigorous stirring into 100 cc. of ice and water. The reaction product, 1-hydroxy-3-chloro-4-(2,2,2-trifluoroethylamino)-anthraquinone is recovered by filtration, washed well with hot water and dried. The dye compound thus obtained is purified by crystallization from xylene, for example. It colors cellulose acetate pinkish-orange shades.

By the use of 4 grams of 1-(2,2-difluoroethylamino)-2,4-dichloro-anthraquinone in place of 1-(2,2,2 - trifluoroethylamino) - 2,4 - dichloroanthraquinone in the foregoing example, 1-hydroxy-3-chloro-4-(2,2 - difluoroethylamino) - anthraquinone is obtained. It colors cellulose acetate textile materials pinkish-orange shades.

*Example 8*

2.1 grams of 1-hydroxy-4-(2,2-difluoroethylamino)-anthraquinone and 0.7 grams of anhydrous sodium acetate are placed in 50 cc. of glacial acetic acid and reacted with .3 gram of chlorine exactly in accordance with the procedure described in Example 5. The 1-hydroxy-2-chloro - 4 - (2,2 - difluoroethylamino) - anthraquinone formed is worked up and purified in accordance with the procedure described in Example 5. It colors cellulose acetate textile materials red shades.

By the use of 2.3 grams of 1-hydroxy-4-(2,2-difluoro-n-butylamino)-anthraquinone in place of 1-hydroxy - 4-(2,2 - difluoroethylamino) - anthraquinone in the foregoing example, 1-hydroxy-2-chloro - 4-(2,2 - difluoro-n-butylamino) - anthraquinone is obtained. It colors cellulose acetate textile materials red shades.

*Example 9*

2 grams of 1-hydroxy-4-(2,2-difluoro-n-propylamino)-anthraquinone and 0.7 gram of anhydrous sodium acetate are placed in 50 cc. of glacial acetic acid and reacted with 1.2 grams of bromine in 15 cc. of glacial acetic acid in accordance with the procedure described in Example 2. The 1-hydroxy-2-bromo-4-(2,2-difluoro-n-propylamino)-anthraquinone formed is worked up and purified in accordance with the procedure described in Example 2. It colors cellulose acetate textile materials red shades.

*Example 10*

2.1 grams of 1-hydroxy-4-(2,2-difluoro-n-butylamino)-anthraquinone and 0.7 gram of anhydrous sodium acetate are placed in 50 cc. of glacial acetic acid and reacted with 1.2 grams of bromine in 15 cc. of glacial acetic acid in accordance with the procedure described in Example 2. The 1-hydroxy - 2-bromo-4-(2,2-difluoro - n - butylamino)-anthraquinone formed is worked up and purified in accordance with the procedure described in Example 2. It colors cellulose acetate textile materials red shades.

*Example 11*

2 grams of 1-hydroxy-4-(2,2-difluoroisopropylamino)-anthraquinone and 0.7 gram of anhydrous sodium acetate are placed in 50 cc. of glacial acetic acid and reacted with 1.2 grams of bromine in 15 cc. of glacial acetic acid in accordance with the procedure described in Example 2. The 1-hydroxy -2- bromo -4-(2,2- difluoroisopropylamino)-anthraquinone formed is worked up and purified in accordance with the procedure described in Example 2. It colors cellulose acetate textile materials red shades.

By the use of 2.1 grams of 1-hydroxy-4-(2,2,2-trifluoroisopropylamino)-anthraquinone in place of 1-hydroxy-4-(2,2-difluoroisopropylamino)-anthraquinone in the foregoing example 1-hydroxy-2-bromo - 4-(2,2,2 - trifluoroisopropylamino)-anthraquinone having the formula:

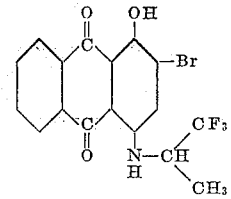

is obtained. It colors cellulose acetate textile materials red shades.

*Example 12*

2.3 grams of 1-hydroxy-4-(2,2,2-trifluoroisopropylamino)-anthraquinone and 0.7 gram of anhydrous sodium acetate are placed in 50 cc. of glacial acetic acid and reacted with .3 gram of chlorine exactly in accordance with the procedure described in Example 5. The 1-hydroxy-2-chloro - 4 - (2,2,2 - trifluoroisopropylamino) - anthraquinone formed is worked up and purified in accordance with the procedure described in Example 5. It colors cellulose acetate textile materials red shades.

By the use of 2.1 grams of 1-hydroxy-4-(2,2-difluoroisopropylamino)-anthraquinone in place of 1-hydroxy-4-(2,2,2-trifluoroisopropylamino)-anthraquinone in the foregoing example, 1-hydroxy-2-chloro - 4-(2,2-difluoroisopropylamino)-anthraquinone is obtained. It colors cellulose acetate materials red shades.

*Example 13*

4 grams of 1-(2,2-difluoro-n-propylamino)-2,4-dichloroanthraqinone, 20 grams of 3-5% oleum and 2 grams of boric acid are reacted together exactly in accordance with the procedure described in Example 7. The 1-hydroxy-3-chloro-4-(2,2-difluoro - n - propylamino)-anthraquinone formed is worked up and purified in accordance with the procedure described in Example 7. It colors cellulose acetate textile materials red shades.

By the use of 4.1 grams of 1-(2,2-difluoro-n-butylamino)-2,4-dichloro-anthraquinone in place of 1-(2,2-difluoro-n-propylamino)-anthraquinone in the foregoing example, 1-hydroxy-3-chloro-4-(2,2-difluoro-n-butylamino)-anthraquinone is obtained. It colors cellulose acetate textile materials red shades.

Example 14

4 grams of 1-(2,2-difluoroisopropylamino)-2,4-dichloro-anthraquinone, 20 grams of 3-5% oleum and 2 grams of boric acid are reacted together exactly in accordance with the procedure described in Example 7. The 1-hydroxy-3-chloro-4-(2,2-difluoroisopropylamino)-anthraquinone formed is worked up and purified in accordance with the procedure described in Example 7. It colors cellulose acetate textile materials red shades.

By the use of 4.1 grams of 1-(2,2,2-trifluoroisopropylamino)-2,4-dichloro-anthraquinone in place of 1-(2,2-difluoroisopropylamino)-2,4-dichloro-anthraquinone in the foregoing example, 1-hydroxy-3-chloro-4-(2,2,2-trifluoroisopropylamino)-anthraquinone is obtained. It colors cellulose acetate textile materials red shades.

Example 15

5.1 grams of 1-2,2,2-trifluoroisopropylamino)-2,4-dibromo-anthraquinone, 2 grams of boric acid and 20 grams of 3-5% oleum are reacted together exactly in accordance with the procedure described in Example 3. The 1-hydroxy-3-bromo-4-(2,2,2-trifluoroisopropylamino)-anthraquinone formed is worked up and purified in accordance with the procedure described in Example 3. It colors cellulose acetate textile materials red shades.

By the use of 5 grams of 1-(2,2-difluoroisopropylamino)-2,4-dibromo-anthraquinone in place of 1-(2,2,2-trifluoroisopropylamino)-2,4-dibromo-anthraquinone in the foregoing example, 1-hydroxy-3-bromo-4-(2,2-difluoroisopropylamino)-anthraquinone is obtained. It colors cellulose acetate textile materials red shades.

In order that the preparation of the compounds of my invention may be entirely clear, the preparation of various intermediate compounds used in their manufacture is described hereinafter.

Example A.—1-hydroxy-4-(2,2-difluoro-n-propylamino)-anthraquinone 2.42 grams of leuco quinizarin, 1.14 grams of 2,2-difluoro-n-propylamine and 40 cc. of n-butyl alcohol are placed in a 100 cc. round-bottomed, three-necked flask fitted with a condenser and a sealed stirrer. The reactants are refluxed on a steam bath with stirring for 6-7 hours, the color changing from a pale yellowish-brown to a reddish-violet. 5 cc. of water and 2.31 grams of $NaBO_3.4H_2O$ are then added and the reaction mixture is heated with stirring at 90° C.-95° C. for 2 hours after which it is poured into 600 cc. of water. The precipitate which forms is recovered by filtration, washed with water, and dried. The 1-hydroxy-4-(2,2-difluoro-n-propylamino)-anthraquinone thus obtained is purified by twice crystallizing from ethyl alcohol. It melts at 133° C.-138° C. and colors cellulose acetate bright reddish-violet shades which are very fast to gas and light.

Example B.—1-hydroxy-4-(2,2-difluoro-n-butylamino)-anthraquinone 7.26 grams of leuco quinizarin, 3.6 grams of 2,2-difluoro-n-butylamine and 40 cc. of n-butyl alcohol are placed in a 100 cc. round-bottomed, three-necked flask fitted with a condenser and a sealed stirrer. The reactants are refluxed on the steam bath with stirring for 6-7 hours, the color changing from a pale yellowish-brown to a reddish-violet. 10 cc. of water and 6.9 grams of $NaBO_3.4H_2O$ are then added and the reaction mixture is heated with stirring at 90° C.-95° C. for 2 hours with stirring, after which it is poured into 600 cc. of water. The dye compound formed is recovered by filtration, washed with water, and dried. The 1-hydroxy-4-(2,2-difluoro-n-butylamino)-anthraquinone thus obtained is a red-brown powder which after crystallization from ethyl alcohol melts at 127° C.-129° C. It colors cellulose acetate textile materials reddish-violet shades which have very good resistance to light and gas fading. The shades obtained with this dye are somewhat bluer than those obtained with the dye of Example A.

Example C.—1-hydroxy-4-(2,2,2-trifluoroisopropylamino)-anthraquinone 2.42 grams of leuco quinizarin and 1.41 grams of 2,2,2-trifluoroisopropylamine

are placed in 20 cc. of n-butyl alcohol and sealed in a Carius tube. The tube is heated at 150° C. for 24 hours with shaking after which it is cooled and the contents removed. The tube is washed with 15 cc. of n-butyl alcohol. A blood-red solution is obtained which is combined with the contents first removed from the tube. The combined liquids are oxidized with 2.31 grams of $NaBO_3.4H_2O$ at 90° C.-95° C. for 2-3 hours and then the resulting reaction mixture is poured into 400 cc. of water and the precipitate which forms is recovered by filtration, washed with water and dried. The 1-hydroxy-4-(2,2,2-trifluoroisopropylamino)-anthraquinone thus obtained as a reddish-brown solid is purified by recrystallization from 20 cc. of boiling xylene. It melts at 143° C.-145° C. and colors cellulose acetate textile materials pink shades having excellent fastness to gas and light.

Example D.—1-hydroxy-4-(2,2-difluoroisopropylamino)-anthraquinone 7.26 grams of leuco-quinizarin, 3.14 grams of 2,2-difluoroisopropylamine

and 40 cc. of n-butyl alcohol are placed in a 100 cc. round-bottomed, 3-necked flask fitted with a condenser and a sealed stirrer. The reactants are refluxed on the steam bath with stirring for 6-7 hours, the color changing from a pale yellowish-brown to a reddish-violet. 10 cc. of water and 6.9 grams of $NaBO_3.4H_2O$ are then added and the reaction mixture is heated with stirring at 90° C.-95° C. for 2 hours, after which it is poured into 600 cc. of water. The dye compound formed is recovered by filtration, washed with water and dried. The 1-hydroxy-4-β,β-difluoroisopropylamino-anthraquinone thus obtained is a red-brown powder, which, upon crystallization from ethyl alcohol, melts at 130° C.–133° C. It colors cellulose acetate textile materials bright red-violet shades which have very good fastness to light and gas.

1 - hydroxy - 4 -(2,2,2 - trifluoroethylamino)-anthraquinone and 1-hydroxy-4-(2,2-difluoroethylamino)-anthraquinone are prepared as described in my U. S. Patents 2,466,008 and 2,466,009, respectively, patented April 5, 1949.

*Example E.—Preparation of 2,2-difluoro-n-propylamine*

48 grams of $CH_3CF_2CH_2Br$, J. A. C. S., vol. 59, page 2434 (1937), are heated with 200 cc. of 28% aqueous ammonia and 1 gram of a wetting agent such as Nacconol NR (sodium alkyl naphthalene sulfonate) in a shaking autoclave at 130° C.–150° C. for 24 hours. The reaction mixture is then carefully distilled through an efficient fractionating column, $NH_3$ gas coming off first. The amine fraction distilling over from 60° C.–85° C. is then collected and dried over solid NaOH and then finally redistilled from fresh solid NaOH. 2,2-difluoro-n-propylamine distils over at 75° C.–77° C. and has a refractive index of $N_D^{25}$ 1.3622. It is a water-white liquid miscible with water and with other ordinary organic solvents and has a characteristic amine odor.

*Example F.—Preparation of 2,2,2-trifluoroisopropylamine*

1,1,1-trifluoroacetone is heated in an autoclave at 90° C.–100° C. for 5 hours with a water solution of hydroxylamine hydrochloride and sodium acetate to form the oxime. The process is substantially the same as that employed by Swarts, Bull sci. acad. roy. Belg., No. 4, page 178 (1927).

25 grams of the oxime reaction product obtained as just described is hydrogenated in ethyl ether in an autoclave under 2000 pounds hydrogen pressure using Raney nickel as a catalyst. Upon completion of the hydrogenation reaction the ether solution is filtered and the filtrate is acidified with ethereal hydrogen chloride to obtain 2,2,2-trifluoroisopropylamine in its hydrochloride form, which is recrystallized from its solution in ethyl alcohol-ethyl ether.

Calculated for $C_3H_7ClF_3N$: C, 24.4; H, 4.7; N, 9.4.

Found: C, 24.3; H, 4.6; N, 9.3.

The free amine is obtained from the amine hydrochloride by treating with an aqueous 50% KOH solution and distilling off the amine. It boils at 46° C.–47° C. at 760 mm. and has a refractive index of $N_D^{20}$ 1.3210.

2,2,2-trifluoroisopropylamine can also be prepared by reacting $CF_3CHBrCH_3$ with concentrated aqueous ammonia in an autoclave.

*Example G.—Preparation of 2,2-difluoroisopropylamine*

This compound is prepared in accordance with the procedure described in connection with 2,2,2-trifluoroisopropylamine. That is, difluoroacetone, $CHF_2COCH_3$, is converted to the oxime by treatment with a water solution of hydroxylamine hydrochloride and sodium acetate and the oxime is converted to 2,2-difluoroisopropylamine (B. P. 80° C.–82° C.) in accordance with the procedure used in the case of 2,2,2-trifluoroisopropylamine.

2,2-difluoroisopropylamine can also be prepared by reacting $CHF_2CHBrCH_3$ with concentrated aqueous ammonia in an autoclave.

*Example H.—Preparation of 2,2-difluoro-n-butylamine*

52 grams of 1-bromo-2,2-difluoro-n-butane ($CH_3CH_2CF_2CH_2Br$) are heated with 200 cc. of 28% aqueous ammonia and 1 gram of a wetting agent such as Nacconol NR (sodium alkyl naphthalene sulfonate) in a shaking autoclave at 135° C.–150° C. for 24 hours. The reaction mixture is then carefully distilled through an efficient fractionating column, $NH_3$ gas coming off first. The amine fraction distilling over from 85° C.–110° C. is then collected and dried over solid NaOH and then finally redistilled from fresh solid NaOH. 2,2-difluoro-n-butylamine distills over at 100° C.–102° C. It is a water-white liquid miscible with water and with other ordinary organic solvents and has a characteristic amine odor.

2,2-difluoro-n-butylamine can also be prepared by using 39 grams of 1-chloro-2,2-difluoro-n-butane (a known compound) in place of 1-bromo-2,2-difluoro-n-butane in the foregoing reaction. However, in this latter case a reaction temperature of 170° C.–185° C. should be employed instead of 135° C.–150° C.

*Example I.—Preparation of 1-bromo-2,2-difluoro-n-butane*

250 grams of 1,2-dibromo-2-chloro-n-butane ($CH_3CH_2CClBrCH_2Br$) and 262 grams of anhydrous $HgF_2$ are placed in a 500 cc. round-bottomed flask cooled in an ice bath. The flask is fitted with a still head and a water-cooled receiver. The ice bath is removed and the reactants heat up spontaneously. Following this exothermic reaction, the reaction mixture is heated by means of a flame. The desired reaction product, 1-bromo-2,2-difluoro-n-butane, beings distilling over at 95° C. Heating by a moving flame, for example, is continued until 120 grams of crude product distils over from 95° C.–108° C. The 120 grams of crude product thus obtained is dried over $CaCl_2$ and fractionated, to yield 90 grams (52%) of $$CH_3CH_2CF_2CH_2Br$$

boiling at 103° C.–104° C.

*Example J.—Preparation of 1,2-dibromo-2-chloro-n-butane*

To a 1-liter, 3-necked flask fitted with a stirrer and cooled to 10° C. are added 181 grams of 2-chloro-1-butene. Over a period of about 1 hour 320 grams of bromine is added dropwise so that only addition takes place. The reaction product thus obtained is washed with an aqueous sodium bisulfite solution and then water after which it is dried over calcium chloride. Fractionation under reduced pressure yields 390 grams (79%) of $CH_3CH_2CClBrCH_2Br$ boiling at 90° C.–93° C.

2,2-difluoroethylamine is disclosed in Bull. sci. acad. roy. Belg., page 762 (1904) and 2,2,2-trifluoroethylamine is disclosed in U. S. Patent 2,348,321, patented May 9, 1944.

Compounds having the formula:

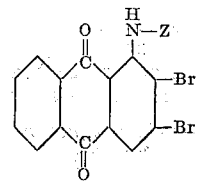

wherein Z has the meaning previously assigned to it are prepared by brominating a compound having the formula:

I.

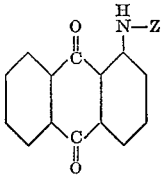

wherein Z has the meaning previously assigned to it.

*Example K.—1-(2,2-difluoroethylamino)-2,4-dibromo-anthraquinone*

1.55 grams of 1-(2,2-difluoroethylamino)-anthraquinone and 1.07 grams of sodium acetate are dissolved in 20 cc. of glacial acetic acid and 2.05 grams of bromine in 10 cc. of glacial acetic acid are added thereto with stirring during two hours at 60° C.–75° C. The reaction mixture is heated for 5 hours more at 60° C.–75° C. after which is is cooled and filtered. The weight of dried 1-(2,2-difluoroethylamino)-2,4-dibromo-anthraquinone obtained is 2.05 grams, melting at 125° C.–135° C. Upon crystallization from acetic acid the product melts at 140° C.–142° C.

1-(2,2,2-trifluoroethylamino)-2,4-dibromo-anthraquinone, 1-(2,2-difluoro-n-propylamino)-2,4-dibromo-anthraquinone, 1-(2,2-difluoro-n-butylamino)-2,4-dibromo-anthraquinone, etc. are prepared similarly.

Compounds having the formula:

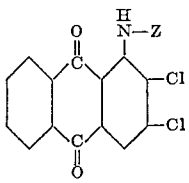

wherein Z has the meaning previously assigned to it are prepared by chlorinating a compound having the formula numbered I.

*Example L.—1-(2,2,2-trifluoroethylamino)-2,4-dichloro-anthraquinone*

1.65 grams of 1-(2,2,2-trifluoroethylamino)-anthraquinone and 1.07 grams of sodium acetate are dissolved in 20 cc. of glacial acetic acid and .47 gram of chlorine are bubbled into the reaction mixture with stirring during two hours at 60° C.–75° C. The reaction mixture is heated for 5 hours more at 60° C.–75° C., after which it is cooled and filtered. 1-(2,2,2-trifluoroethylamino)-2,4-dichloro-anthraquinone is obtained. It is purified by crystallization from a solvent such as toluene, for example.

1-(2,2-difluoroethylamino)-2,4-dichloro-anthraquinone, 1-(2,2-difluoro-n-propylamino)-2,4-dichloro-anthraquinone, 1-(2,2-difluoro-n-butylamino)-2,4-dichloro-anthraquinone, etc. are prepared similarly.

Compounds having the formula numbered I are prepared by reacting sodium α-anthraquinone sulfonic acid with an amine having the formula H·N-Z, wherein Z has the meaning previously assigned to it, in water in the presence of sodium chlorate. Their manner of preparation will be illustrated with reference to the preparation of 1-(2,2-difluoroethylamino)-anthraquinone.

*Example M.—1-(2,2-difluoroethylamino)-anthraquinone*

3.10 grams of sodium α-anthraquinone sulfonic acid, 4.05 grams of 2,2-difluoroethylamine, 0.364 gram of sodium chlorate and 14 cc. of water are placed in a sealed glass tube and heated in a shaking autoclave at 165° C. for 13 hours. After cooling, the reaction product is removed from the tube with the aid of water and made acid to Congro red paper. The reaction mixture is then filtered and the 1-(2,2-difluoroethylamino)-anthraquinone thus obtained on the filter is washed with several portions of hot water. Upon drying the product weighs about 1.3 grams and melts at 174° C.–176° C. Upon crystallization from ethyl alcohol the product has a melting point of 178° C.–179° C.

1-(2,2,2-trifluoroethylamino)-anthraquinone, 1-(2,2-difluoro-n-propylamino)-anthraquinone, 1-(2,2-difluoroisopropylamino)-anthraquinone, etc. are prepared similarly.

Compounds having the formula numbered I are also prepared by reacting 1-nitro-anthraquinone with an amine having the formula H₂N-Z, wherein Z has the meaning previously assigned to it, in dry pyridine. This manner of preparation will be illustrated with reference to the preparation of 1-(2,2,2-trifluoroethylamino)-anthraquinone.

*Example N.—1-(2,2,2-trifluoroethylamino)-anthraquinone*

10 grams of 1-nitro-anthraquinone in 100 grams of dry pyridine are heated to 100° C. and 5 grams of 2,2,2-trifluoroethylamine are added dropwise. A reddish color indicating reaction develops at once and after a short period of heating, preferably with stirring, the reaction is complete. 1-(2,2,2-trifluoroethylamino)-anthraquinone crystallizes out of the pyridine on cooling and is recovered by filtration. It can be further purified by recrystallization from a solvent such as pyridine, toluene or acetic acid.

1-(2,2-difluoroethylamino)-anthraquinone is prepared by substituting 4 grams of 2,2-difluoroethylamine for the 5 grams of 2,2,2-trifluoroethylamine in the above example and carrying out the procedure exactly as described.

1-(2,2-difluorobutylamino)-anthraquinone, 1-(2,2,2-trifluoroisopropylamino)-anthraquinone, etc. are prepared similarly.

The anthraquinone dye compounds of my invention may be advantageously directly applied to the material undergoing coloration in the form of an aqueous suspension which can be prepared by grinding the dye to a paste in the presence of a sulfonated oil, soap, sodium lignin sulfonate, or other suitable dispersing agent and dispersing the resulting paste in water.

Direct dyeing operations can, with advantage, be conducted at temperatures of about 70° C.–90° C. but any suitable temperature can be used. Thus, the textile material such as cellulose acetate, for example, to be dyed or colored is ordinarily added to the dye bath at a temperature lower than that at which the main portion of the dyeing is to be effected. A temperature approximating 45° C–55° C., for example, following which the temperature is raised to that selected for carrying out the dyeing operation. The temperature at which the dyeing is conducted may, of course, be varied somewhat depending upon the particular material undergoing coloration. The amount of dye used can be, for example, ⅓% to 3% (by weight) of that of the textile material, although lesser or greater amounts of dye can be used.

I claim:
1. The anthraquinone dye compound having the formula:

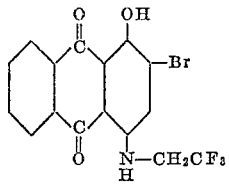

2. The process of preparing an anthraquinone compound having the general formula:

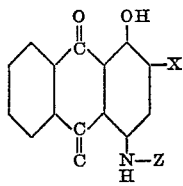

wherein X represents a halogen atom having an atomic weight between 35 and 80 and Z represents a member selected from the group consisting of the 2,2-difluoroethyl group, the 2,2-difluoro-n-propyl group, the 2,2-difluoro-n-butyl group, the 2,2-difluoroisopropyl group, the 2,2,2-trifluoroethyl group and the 2,2,2-trifluoroisopropyl group which comprises reacting an anthraquinone compound having the general formula:

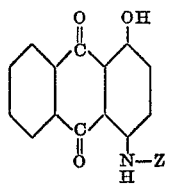

wherein Z has the meaning previously assigned to it with a halogen having an atomic weight between 35 and 80 in the presence of an alkali metal acetate, wherein the alkali metal has an atomic weight between 22 and 40.

3. The process of preparing an anthraquinone compound having the general formula:

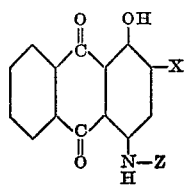

wherein X represents a halogen atom having an atomic weight between 35 and 80 and Z represents a member selected from the group consisting of the 2,2-difluoroethyl group, the 2,2-difluoro-n-propyl group, the 2,2-difluoro-n-butyl group, the 2,2-difluoroisopropyl group, the 2,2,2-trifluoroethyl group and the 2,2,2-trifluoroisopropyl group which comprises reacting an anthraquinone compound having the general formula:

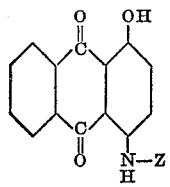

wherein Z has the meaning previously assigned to it with a halogen having an atomic weight between 35 and 80 at a temperature of from about 40° C. to about 120° C. in glacial acetic acid and in the presence of an alkali metal acetate wherein the alkali metal has an atomic weight between 22 and 40.

4. The process of preparing 1-hydroxy-2-bromo-4-(2,2-difluoroethylamino)-anthraquinone which comprises reacting 1-hydroxy-4-(2,2-difluoroethylamino)-anthraquinone with bromine at a temperature of from about 90° C. to about 100° C. in glacial acetic acid and in the presence of sodium acetate.

JOSEPH B. DICKEY.

REFERENCES CITED

The following references are of record in the file of this patent:

UNITED STATES PATENTS

| Number | Name | Date |
|---|---|---|
| 2,236,672 | Coffey et al. | Apr. 1, 1941 |
| 2,287,590 | Wuertz et al. | June 23, 1942 |
| 2,333,402 | Wuertz et al. | Nov. 2, 1943 |
| 2,466,008 | Dickey | Apr. 5, 1949 |
| 2,466,009 | Dickey | Apr. 5, 1949 |

FOREIGN PATENTS

| Number | Country | Date |
|---|---|---|
| 127,532 | Germany | Jan. 1899 |